(12) United States Patent
Zhang et al.

(10) Patent No.: US 12,510,260 B2
(45) Date of Patent: Dec. 30, 2025

(54) METHOD FOR DETECTING REFRIGERANT LEAKAGE, AIR CONDITIONER, AND STORAGE MEDIUM

(71) Applicant: HISENSE (GUANGDONG) AIR CONDITIONING CO., LTD., Jiangmen (CN)

(72) Inventors: Shuming Zhang, Jiangmen (CN); Xingjian Yuan, Jiangmen (CN)

(73) Assignee: HISENSE (GUANGDONG) AIR CONDITIONING CO., LTD., Jiangmen (CN)

( * ) Notice: Subject to any disclaimer, the term of this patent is extended or adjusted under 35 U.S.C. 154(b) by 414 days.

(21) Appl. No.: 18/113,499

(22) Filed: Feb. 23, 2023

(65) Prior Publication Data

US 2023/0258350 A1 Aug. 17, 2023

Related U.S. Application Data

(63) Continuation of application No. PCT/CN2021/143421, filed on Dec. 30, 2021.

(30) Foreign Application Priority Data

Jun. 30, 2021 (CN) .......................... 202110741119.4

(51) Int. Cl.
*F24F 11/36* (2018.01)
*F24F 11/61* (2018.01)
(Continued)

(52) U.S. Cl.
CPC .............. *F24F 11/36* (2018.01); *F24F 11/61* (2018.01); *F24F 11/64* (2018.01); *F24F 11/65* (2018.01);
(Continued)

(58) Field of Classification Search
CPC .. F24F 11/36; F24F 11/61; F24F 11/64; F24F 11/65; F24F 11/77; F24F 11/86
See application file for complete search history.

(56) References Cited

U.S. PATENT DOCUMENTS

| 5,713,213 A | 2/1998 | Nobuta et al. |
| 2002/0026801 A1* | 3/2002 | Yamashita .............. F04B 35/04 62/181 |

(Continued)

FOREIGN PATENT DOCUMENTS

| CN | 103940560 A | * 7/2014 |
| CN | 104655365 A | 5/2015 |

(Continued)

OTHER PUBLICATIONS

First Chinese Office Action dated Mar. 21, 2022 in corresponding Chinese Application No. 202110741119.4, translated, 28 pages.

(Continued)

*Primary Examiner* — Mohammad Ali
*Assistant Examiner* — Vincent W Chang
(74) *Attorney, Agent, or Firm* — MH2 TECHNOLOGY LAW GROUP LLP

(57) ABSTRACT

A method for detecting refrigerant leakage includes: when an air conditioner receives a cooling instruction or a dehumidification instruction, a controller controlling the air conditioner to perform a cooling operation or a dehumidification operation, during the cooling operation or the dehumidification operation, the controller controlling the air conditioner to perform a preset first control strategy for a first time to determine whether the air conditioner satisfies a plurality of preset sub-conditions; if so, the controller controlling the air conditioner to perform a preset second control strategy; after the second control strategy has been performed, the controller controlling the air conditioner to perform the first control strategy for a second time to determine whether the (Continued)

air conditioner satisfies the plurality of preset sub-conditions for a second time; and, if so, the controller controlling the air conditioner to send out alarm information.

18 Claims, 9 Drawing Sheets

(51) Int. Cl.
  *F24F 11/64* (2018.01)
  *F24F 11/65* (2018.01)
  *F24F 11/77* (2018.01)
  *F24F 11/86* (2018.01)
  *G05B 19/042* (2006.01)

(52) U.S. Cl.
  CPC .............. *F24F 11/77* (2018.01); *F24F 11/86* (2018.01); *G05B 19/042* (2013.01); *G05B 2219/2614* (2013.01)

(56) References Cited

U.S. PATENT DOCUMENTS

| | | | |
|---|---|---|---|
| 2005/0086952 A1* | 4/2005 | Nonaka | F25D 11/022 62/129 |
| 2018/0187917 A1 | 7/2018 | Suzuki et al. | |
| 2018/0283719 A1 | 10/2018 | Honda et al. | |
| 2022/0018580 A1* | 1/2022 | Kim | F24F 11/36 |
| 2022/0128254 A1 | 4/2022 | Suzuki et al. | |

FOREIGN PATENT DOCUMENTS

| | | |
|---|---|---|
| CN | 105546771 A | 5/2016 |
| CN | 107560100 A | 1/2018 |
| CN | 110410933 A | 11/2019 |
| CN | 110793170 A | 2/2020 |
| CN | 110793171 A | 2/2020 |
| CN | 111457549 A | 7/2020 |
| CN | 113432240 A | 9/2021 |
| IN | 111878915 A | 11/2020 |
| WO | 2016159152 A1 | 10/2016 |
| WO | 2017026014 A1 | 2/2017 |
| WO | 2019116437 A1 | 6/2019 |
| WO | 2021010234 A1 | 1/2021 |

OTHER PUBLICATIONS

Chinese Supplementary Search Report in corresponding Chinese Application No. 202110741119.4, 1 page.
International Search Report and Written Opinion dated Mar. 24, 2022 in corresponding International Application No. PCT/CN2021/143421, translated, 17 pages.
Chinese First Office Action dated Apr. 23, 2025 in corresponding Chinese Application No. 202180055409.1, translated, 23 pages.

* cited by examiner

METHOD FOR DETECTING REFRIGERANT LEAKAGE, AIR CONDITIONER, AND STORAGE MEDIUM

CROSS-REFERENCE TO RELATED APPLICATIONS

This application is a continuation application of International Patent Application No. PCT/CN2021/143421, filed on Dec. 30, 2021, which claims priority to Chinese Patent Application No. 202110741119.4, filed on Jun. 30, 2021, which are incorporated herein by reference in their entirety.

TECHNICAL FIELD

The present disclosure relates to the field of air conditioning technologies, and in particular, to a method for detecting refrigerant leakage, an air conditioner, and a storage medium.

BACKGROUND

With an advancement of science and technology and an improvement of people's living standards, air conditioners have gradually entered people's lives and become an indispensable article for people's work and life.

The air conditioner performs a refrigeration cycle through a compressor, a condenser, an expansion valve and an evaporator. The refrigeration cycle includes a series of processes involving compression, condensation, expansion, and evaporation. The refrigeration cycle of air conditioner cannot be separated from refrigerant, which is exothermic when it condenses and liquefies and endothermic when it evaporates and vaporizes, so as to implement the exchange and transfer of heat.

SUMMARY

In an aspect, a method for detecting refrigerant leakage is provided. The method is used for an air conditioner including a controller, and includes: when an air conditioner receives one of a cooling instruction and a dehumidification instruction, a controller controlling the air conditioner to perform a corresponding one of a cooling operation and a dehumidification operation, wherein in a process of performing the corresponding one of the cooling operation and the dehumidification operation, the controller controls the air conditioner to perform a preset first control strategy for a first time to determine whether the air conditioner satisfies a preset condition, the preset condition including a plurality of preset sub-conditions; if the air conditioner satisfies the plurality of preset sub-conditions simultaneously for a first time, the controller controlling the air conditioner to perform a preset second control strategy for a first time; after the second control strategy has been performed for the first time, the controller controlling the air conditioner to perform the first control strategy for a second time to determine whether the air conditioner satisfies the plurality of preset sub-conditions simultaneously for a second time; and if the air conditioner satisfies the plurality of preset sub-conditions simultaneously for the second time, the controller controlling the air conditioner to send out alarm information indicating a possibility of refrigerant leakage.

In another aspect, an air conditioner is provided. The air conditioner includes a memory and a controller. The memory stores one or more computer programs thereon. The one or more computer programs include instructions that, when executed by the controller, cause the controller to perform the method for detecting refrigerant leakage.

In yet another aspect, a computer-readable storage medium is provided. The computer-readable storage medium has stored thereon computer program instructions that, when run on a controller, cause the controller to perform the method for detecting refrigerant leakage.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods, and actual timings of signals involved in the embodiments of the present disclosure.

DETAILED DESCRIPTION

Figure 1:
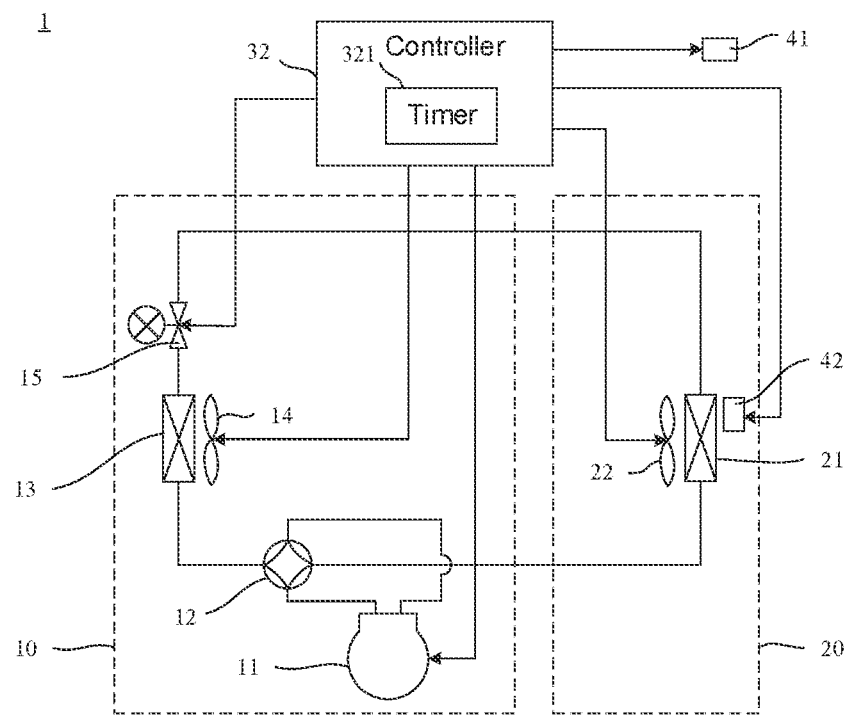
FIG. 1 is a schematic diagram of an air conditioner, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "'comprises'" and the present participle form "comprising" are construed in an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are only used for descriptive purposes and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "multiple", "a plurality of" or "the plurality of" means two or more unless otherwise specified.

The phrase "at least one of A, B and C" has a same meaning as the phrase "at least one of A, B or C," and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term if is optionally construed as "when" or "in a case where" or "in response to determining" or "in response to detecting," depending on the context. Similarly, the phrase "if it is determined" or "if [a stated condition or event] is detected" is optionally construed as "in a case where it is determined" or "in response to determining" or "in a case where [the stated condition or event] is detected" or "in response to detecting [the stated condition or event]," depending on the context.

The phrase "applicable to" or "configured to" as used herein indicates an open and inclusive expression, which does not exclude devices that are applicable to or configured to perform additional tasks or steps.

In addition, the use of the phase "based on" is meant to be open and inclusive, since a process, step, calculation, or other action that is "based on" one or more of the stated conditions or values may, in practice, be based on additional conditions or values exceeding those stated.

The term such as "about," "substantially," or "approximately" as used herein includes a stated value and an average value within an acceptable range of deviation of a particular value. The acceptable range of deviation is determined by a person of ordinary skill in the art in consideration of measurement in question and errors associated with measurement of a particular quantity (i.e., limitations of a measurement system).

An air conditioner 1 is provided. As shown in FIG. 1, the air conditioner 1 is a separate-type air conditioner composed of an outdoor unit 10 and an indoor unit 20. The outdoor unit 10 and the indoor unit 20 are connected through a pipe to convey a refrigerant. The outdoor unit 10 includes a compressor 11, a four-way valve 12, an outdoor heat exchanger 13, a second fan 14 (e.g., an outdoor fan), and an expansion valve 15. The indoor unit 20 includes an indoor heat exchanger 21 and a first fan 22 (e.g., an indoor fan). The compressor 11, the outdoor heat exchanger 13, the expansion valve 15, and the indoor heat exchanger 21 that are connected in sequence form a refrigerant loop. The refrigerant circulates in the refrigerant loop and exchanges heat with the air through the outdoor heat exchanger 13 and the indoor heat exchanger 21, so as to implement a cooling operation or a heating operation of the air conditioner 1.

The compressor 11 is configured to compress the refrigerant, so that a low-pressure refrigerant is compressed to be a high-pressure refrigerant.

The outdoor heat exchanger 13 is configured to perform heat-exchange between outdoor air and the refrigerant conveyed in the outdoor heat exchanger 13. For example, the outdoor heat exchanger 13 operates as a condenser in the cooling operation of the air conditioner 1, so that the refrigerant compressed by the compressor 11 dissipates heat into the outdoor air through the outdoor heat exchanger 13 to be condensed; and the outdoor heat exchanger 13 operates as an evaporator in the heating mode of the air conditioner 1, so that the decompressed refrigerant absorbs heat from the outdoor air through the outdoor heat exchanger 13 to be evaporated.

In some embodiments, the outdoor heat exchanger 13 further includes heat exchange fins, so as to expand a contact area between the outdoor air and the refrigerant conveyed in the outdoor heat exchanger 13, thereby improving heat exchange efficiency between the outdoor air and the refrigerant.

The second fan 14 is configured to suck the outdoor air into the outdoor unit 10 through an outdoor air inlet of the outdoor unit 10 and send the outdoor air, after heat-exchange between the outdoor air and the outdoor heat exchanger 13, out through an outdoor air outlet of the outdoor unit 10. The second fan 14 provides power for the flow of the outdoor air.

The expansion valve 15 is connected between the outdoor heat exchanger 13 and the indoor heat exchanger 21. The pressure of the refrigerant flowing between the outdoor heat exchanger 13 and the indoor heat exchanger 21 is adjusted by an opening degree of the expansion valve 15, so that the flow of the refrigerant flowing between the outdoor heat exchanger 13 and the indoor heat exchanger 21 is adjusted. The flow and the pressure of the refrigerant flowing between the outdoor heat exchanger 13 and the indoor heat exchanger 21 may affect the heat exchange performance of the outdoor heat exchanger 13 and the indoor heat exchanger 21. The expansion valve 15 may be an electronic valve, and the opening degree of the expansion valve 15 is adjustable, and thus the flow and the pressure of the refrigerant flowing through the expansion valve 15 can be controlled.

The four-way valve 12 is connected in the refrigerant loop. The four-way valve 12 is controlled by a controller 32 to switch the flow direction of the refrigerant in the refrigerant loop, so as to cause the air conditioner 1 to perform the cooling operation or the heating operation.

The indoor heat exchanger 21 is configured to perform heat-exchange between indoor air and the refrigerant conveyed in the indoor heat exchanger 21. For example, the indoor heat exchanger 21 operates as an evaporator in the cooling operation of the air conditioner 1, so that the refrigerant, which has dissipated heat through the outdoor heat exchanger 13, absorbs heat from the indoor air through the indoor heat exchanger 21 to be evaporated; and the indoor heat exchanger 21 operates as a condenser in the heating mode of the air conditioner 1, so that the refrigerant, which has absorbed heat through the outdoor heat exchanger 13, dissipates heat into the indoor air through the indoor heat exchanger 21 to be condensed.

In some embodiments, the indoor heat exchanger 21 further includes heat exchange fins, so as to expand a contact area between the indoor air and the refrigerant conveyed in the indoor heat exchanger 21, thereby improving heat exchange efficiency between the indoor air and the refrigerant.

The first fan 22 is configured to suck the indoor air into the indoor unit 20 through an indoor air inlet of the indoor unit 20 and send the indoor air, after heat-exchange between the indoor air and the indoor heat exchanger 21 out through an indoor air outlet of the indoor unit 20. The first fan 22 provides power for the flow of the indoor air.

The controller 32 is configured to control an operating frequency of the compressor 11, the opening degree of the expansion valve 15, and rotation rates of the second fan 14 and the first fan 22. The controller 32 is connected to the compressor 11, the expansion valve 15, the second fan 14, and the first fan 22 through data lines to transmit communication information.

The controller 32 includes a processor. The processor may include a central processing unit (CPU), a microprocessor, or an application specific integrated circuit (ASIC), and may be configured to perform the corresponding operations described with reference to the controller 32 when the processor performs a program stored in a non-transitory computer-readable storage medium coupled to the controller 32. The non-transitory computer-readable storage medium may include a magnetic storage device (e.g., a hard disk, a floppy disk or a magnetic tape), a smart card, or a flash memory device (e.g., an erasable programmable read-only memory (EPROM), a card, a stick, or a keyboard driver).

The above describes an example in which the air conditioner 1 is the separate-type air conditioner, but the present disclosure is not limited thereto. In some embodiments, the air conditioner 1 may be an integrated air conditioner (e.g., a mobile air conditioner).

Figure 2:
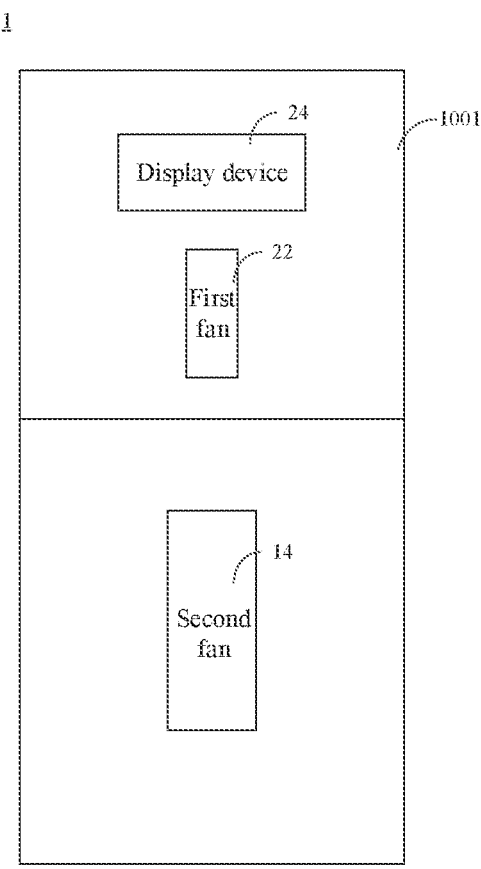
FIG. 2 is a schematic diagram of another air conditioner, in accordance with some embodiments.

As shown in FIG. 2, the air conditioner 1 is the integrated air conditioner, and includes a box body 1001, the first fan 22, the second fan 14, and a display device 24.

The first fan 22 is disposed at the upper portion of the box body 1001 and is configured to discharge the air after exchanging heat with the indoor heat exchanger 21.

The second fan 14 is disposed at the lower portion of the box body 1001 and is configured to reduce the temperature of the compressor 11 in the box body 1001, so as to prevent overheating.

The display device 24 is configured to display the operating mode and the operating temperature of the air conditioner 1, and other information. The refrigeration cycle of air conditioner cannot be separated from refrigerant, which is exothermic when it condenses and liquefies and endothermic when it evaporates and vaporizes, so as to implement the exchange and transfer of heat.

During the operation of the air conditioner 1, if the refrigerant leaks while the compressor 11 operates continuously, it is prone to causing damage to the compressor 11 or causing a fire.

In some embodiments, a method for detecting refrigerant leakage is provided. In the method, an ambient temperature and a temperature of the indoor heat exchanger 21 are collected respectively based on an ambient temperature sensor 41 and a temperature sensor 42 of the indoor heat exchanger 21. According to the ambient temperature and the temperature of the indoor heat exchanger 21, a refrigerant leakage state of the compressor 11 is detected. When the refrigerant leakage appears in the compressor 11, alarm information indicating that there may be refrigerant leakage is sent out by the air conditioner 1. For example, a blinking fault code is displayed on the display device of the air conditioner 1. In this way, while ensuring the reliable operation of the compressor 11, it may be possible to remind the user of the refrigerant leakage fault of the compressor 11. As a result, it may avoid the damage or fire of the compressor 11 caused by the compressor 11 operating continuously when the refrigerant leakage fault exists, which is conducive to improving the safety of the operation of the compressor 11.

The method for detecting refrigerant leakage in some embodiments of the present disclosure will be described below.

Figure 3:
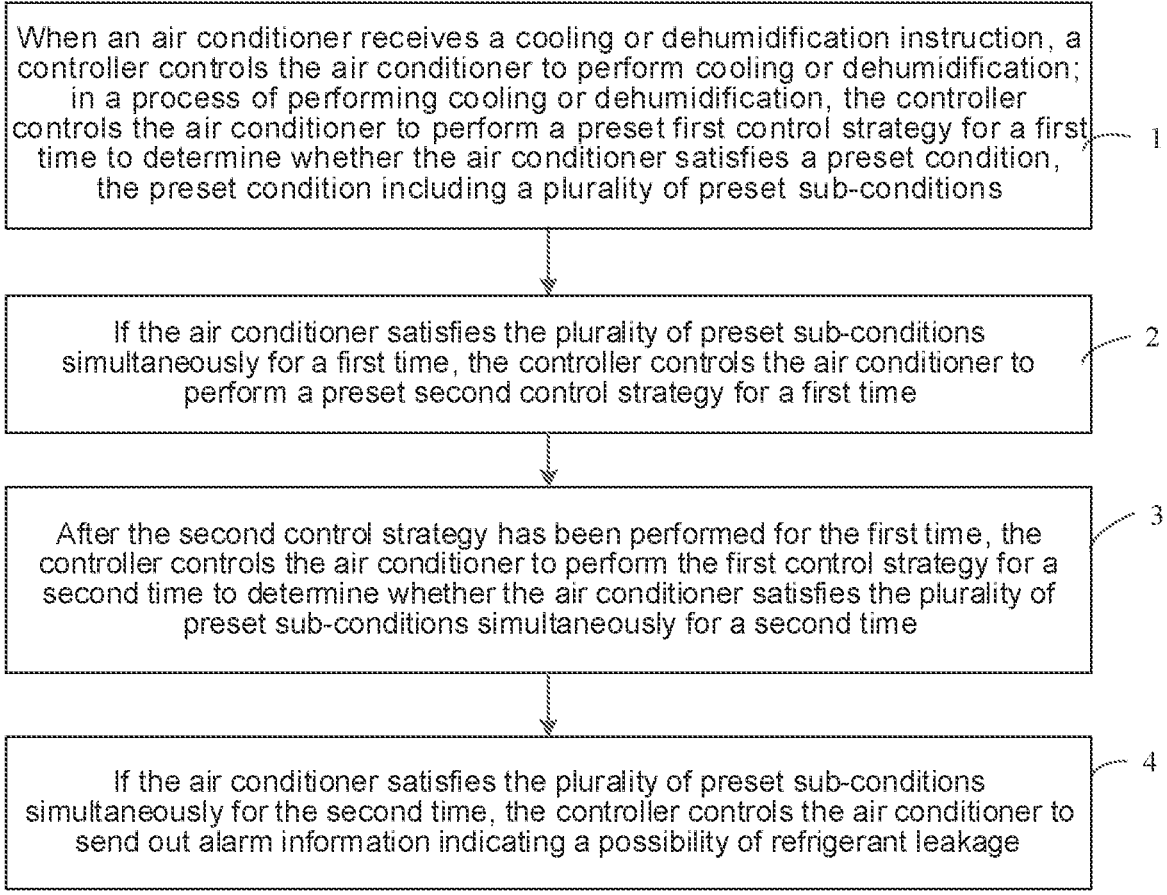
FIG. 3 is a flow diagram of a method for detecting refrigerant leakage, in accordance with some embodiments.
Figure 4A:
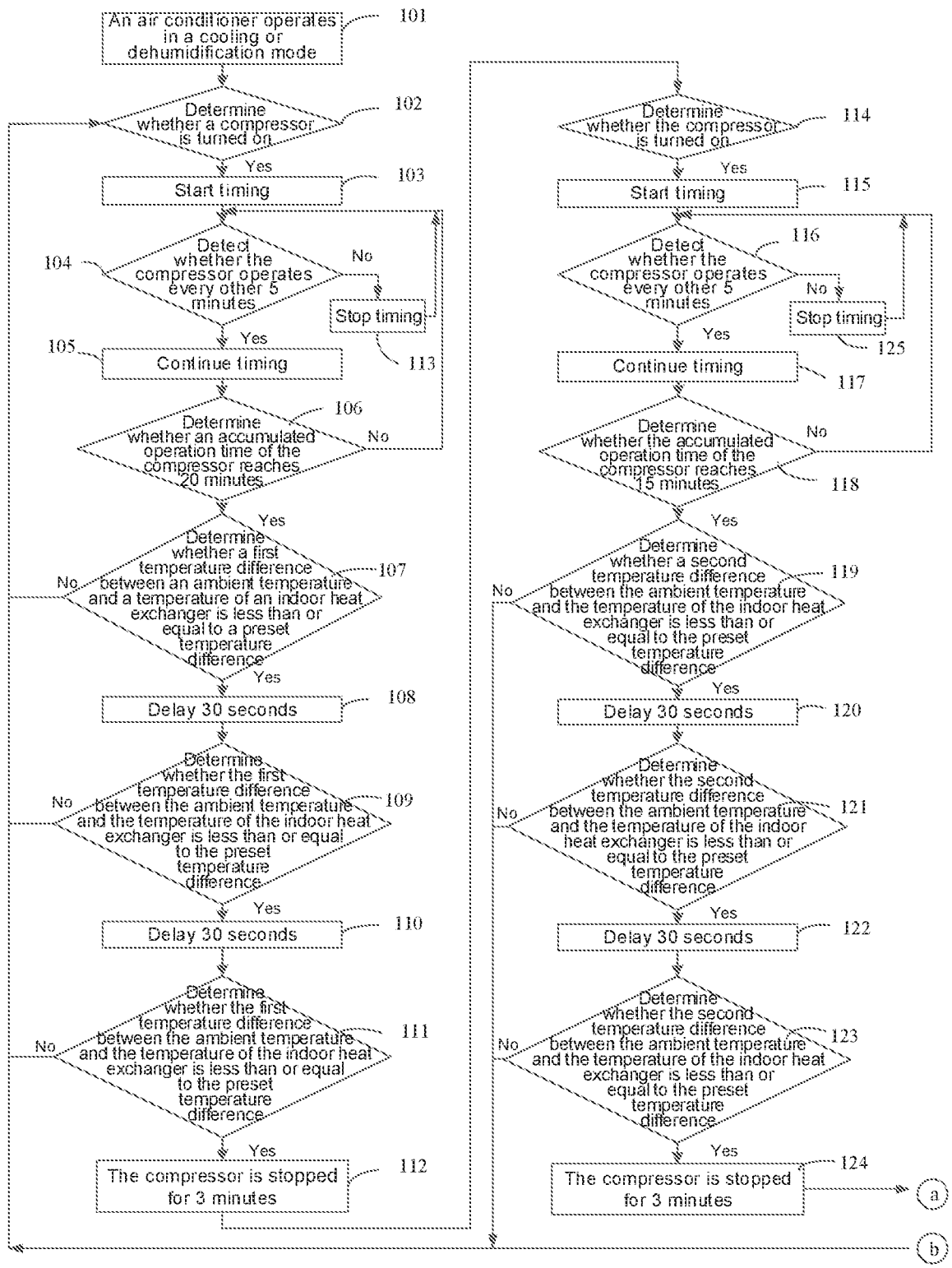
FIGS. 4a to 4f are a flow diagram of another method for detecting refrigerant leakage, in accordance with some embodiments.
Figure 4B:
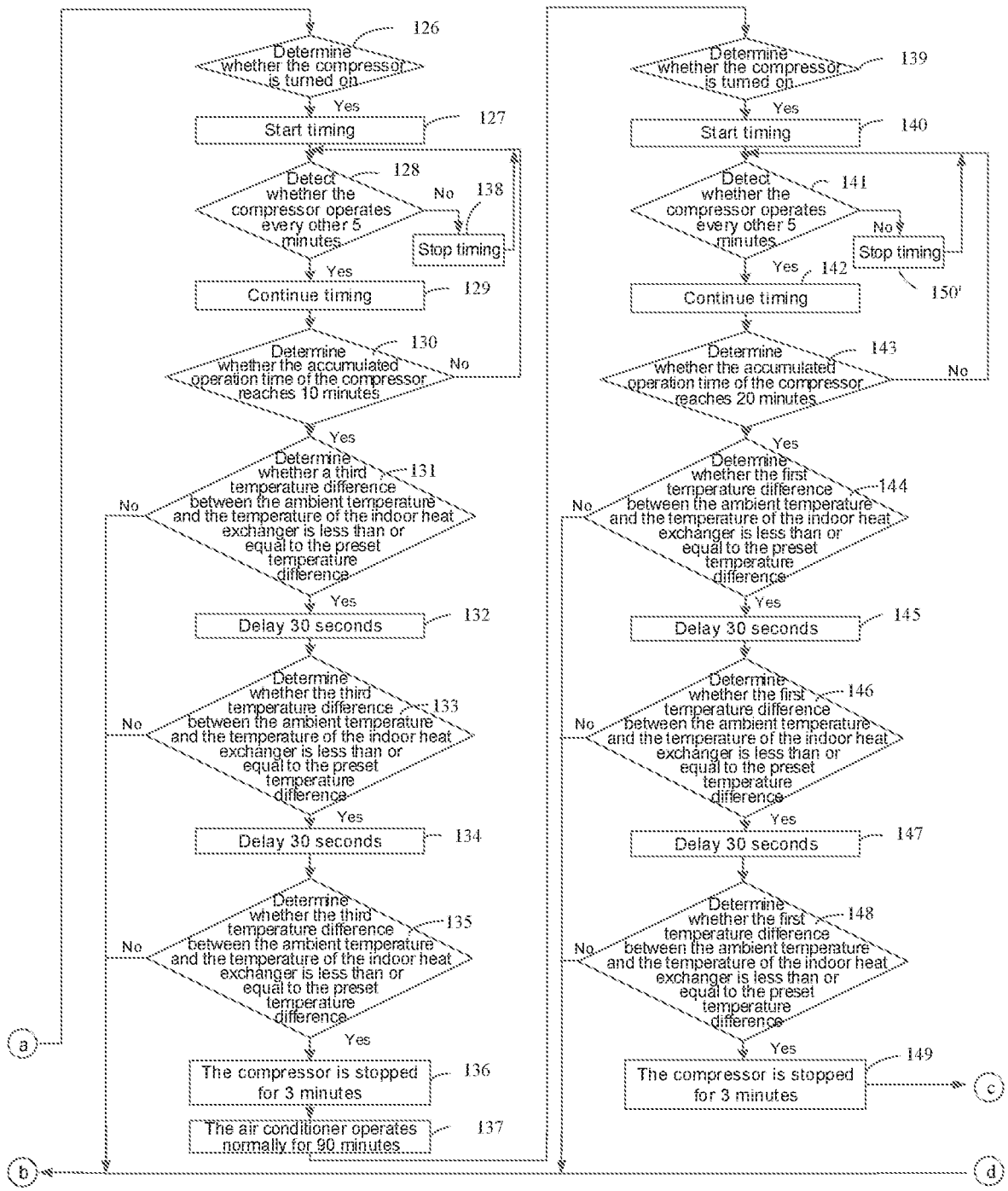
Figure 4C:
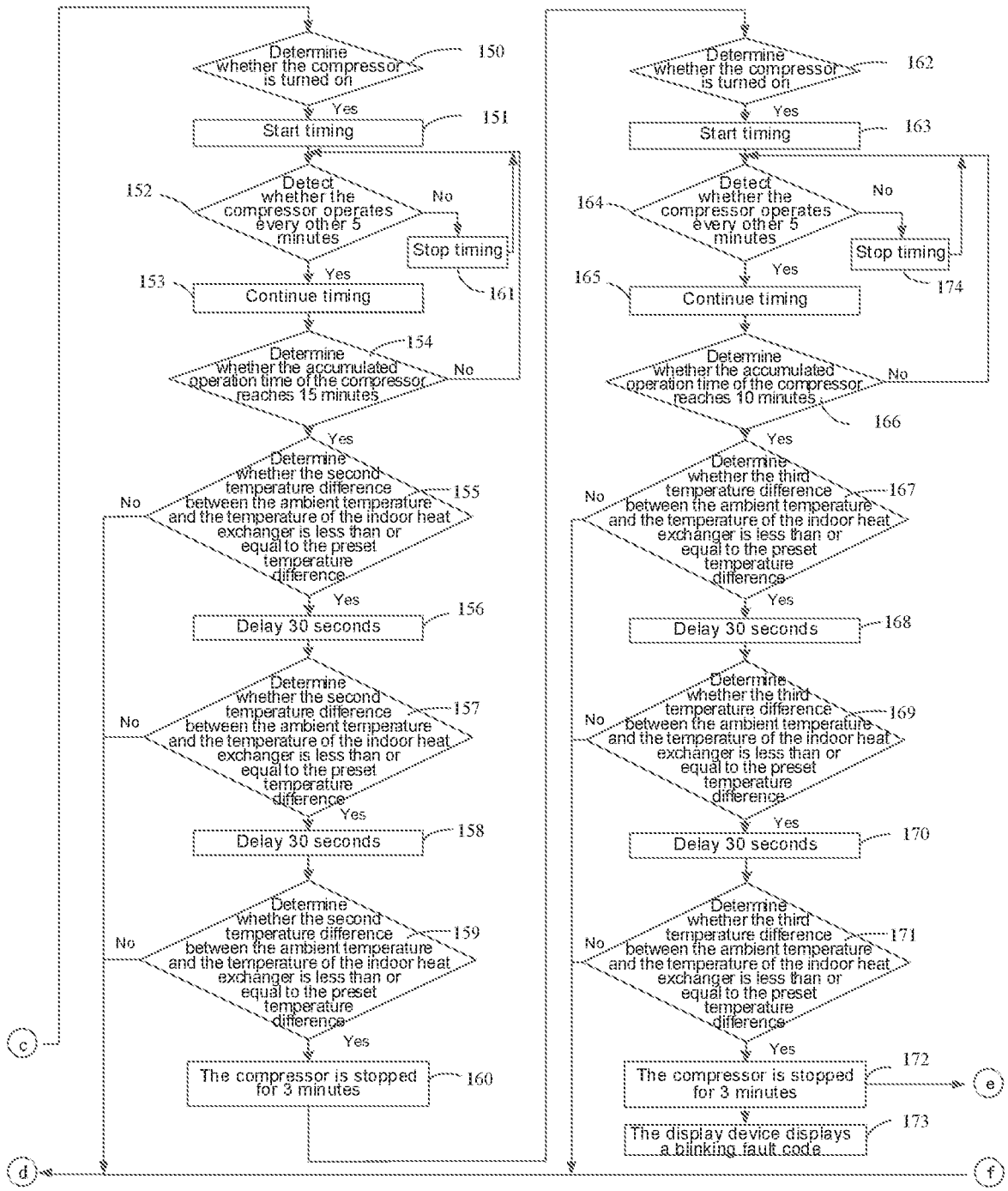
Figure 4D:
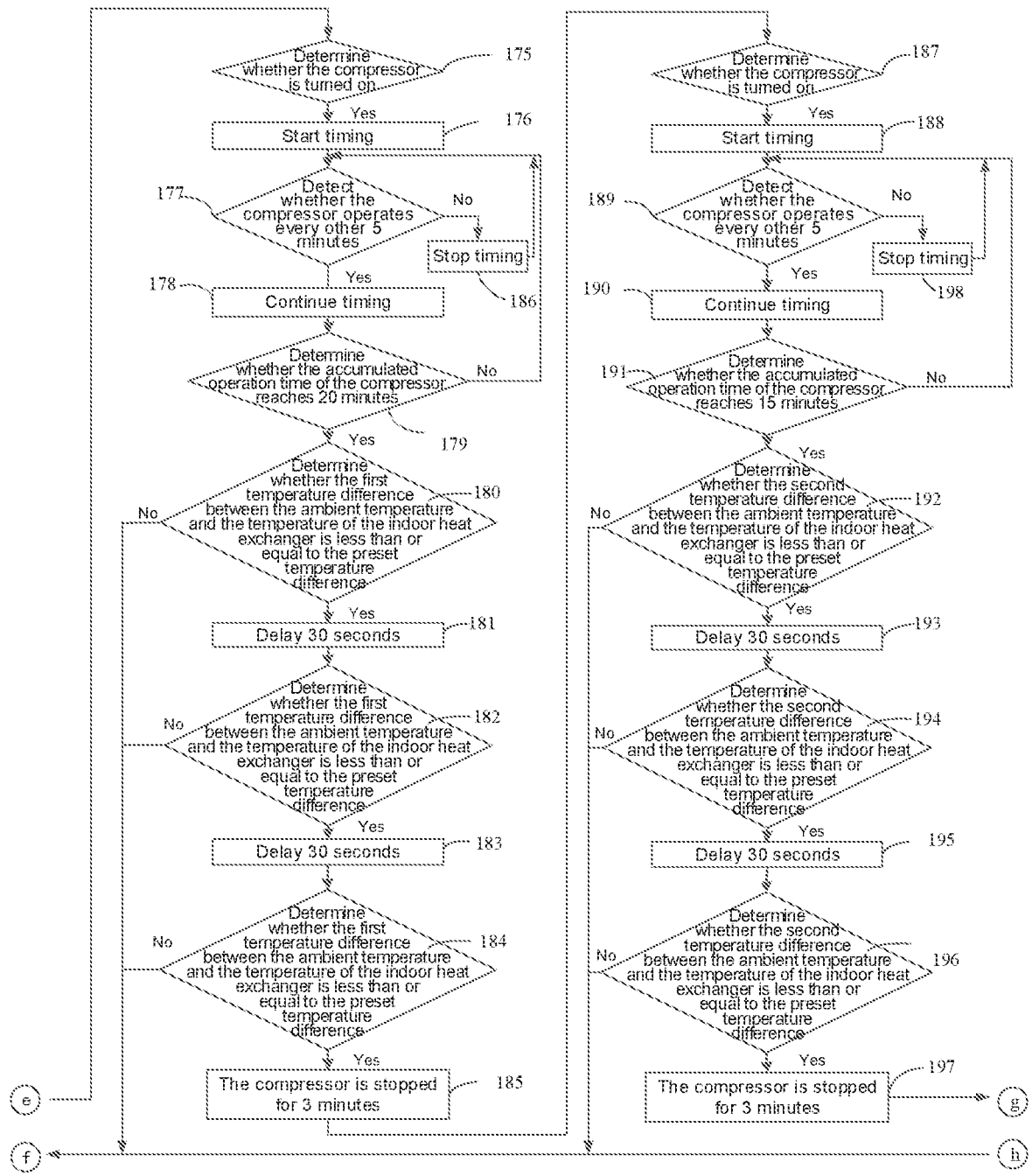
Figure 4E:
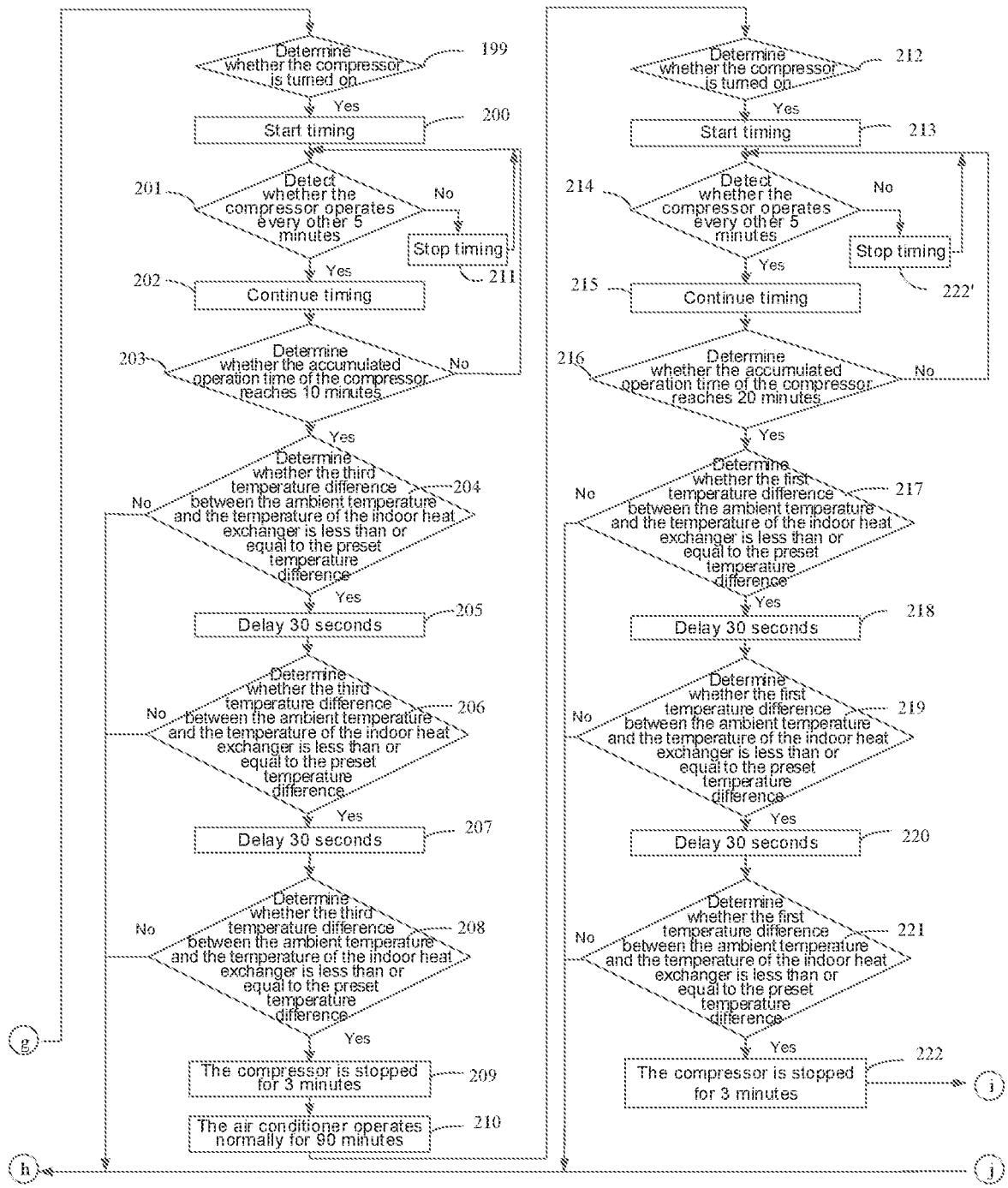
Figure 4F:
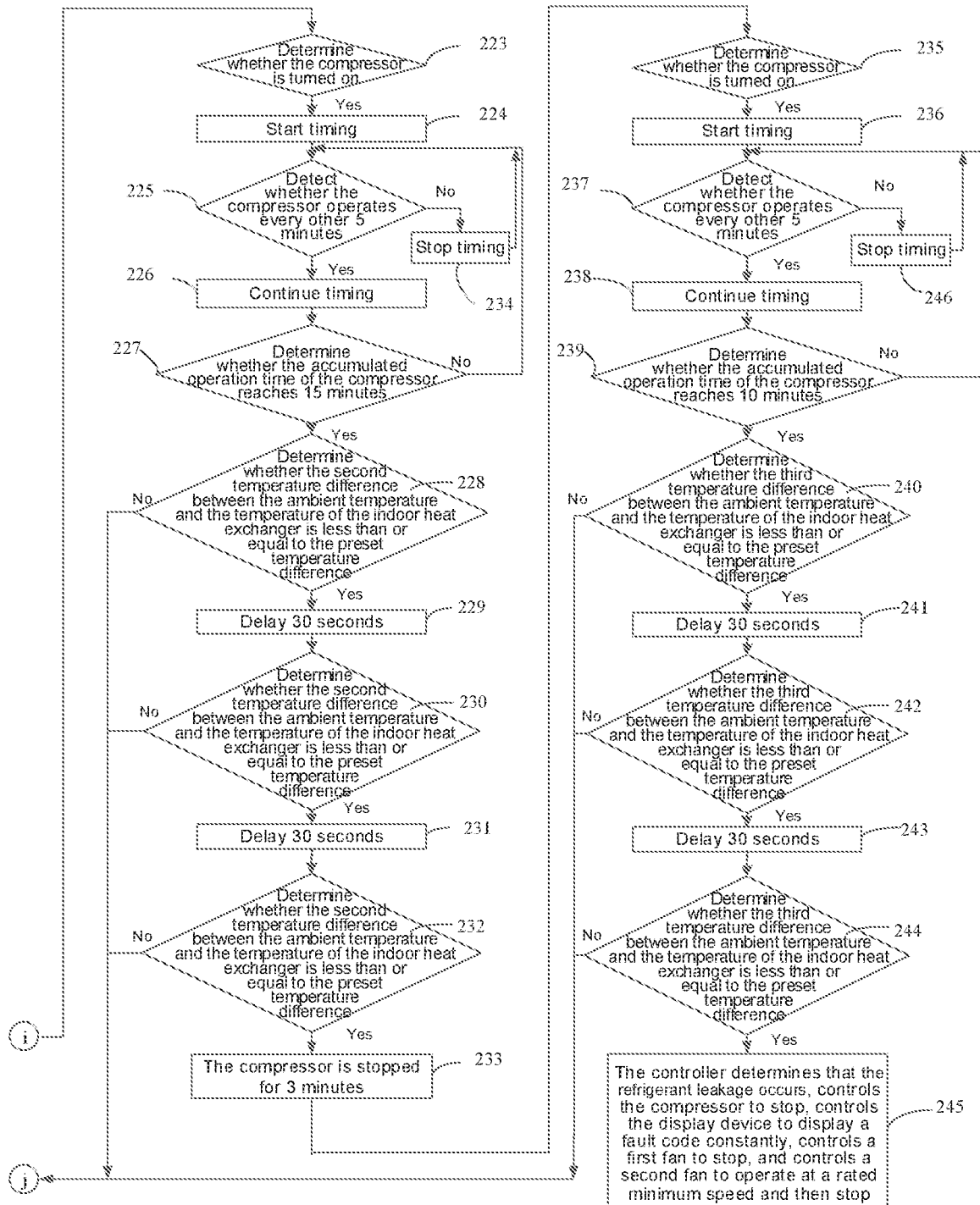

As shown in FIG. 3, the method for detecting refrigerant leakage in some embodiments of the present disclosure includes steps 1 to 4.

In step 1, when receiving a cooling or dehumidification instruction, the controller 32 controls the air conditioner 1 to perform the cooling operation or the dehumidification operation. In a process of performing the cooling operation or the dehumidification operation, the controller 32 controls the air conditioner 1 to perform a preset first control strategy for a first time to determine whether the air conditioner 1 satisfies a preset condition.

The preset condition includes a plurality of preset sub-conditions. For the convenience of description, as shown in FIGS. 4a to 4f, the embodiments of the present disclosure are mainly described by considering an example in which the preset condition includes a first preset sub-condition, a second preset sub-condition, and a third preset sub-condition, which will, however, not be construed as a limitation on the present disclosure.

In some embodiments, the controller 32 controls the air conditioner 1 to perform the preset first control strategy for the first time. The first control strategy is mainly used to determine whether the air conditioner 1 satisfies the first preset sub-condition, the second preset sub-condition, and the third preset sub-condition.

For example, the controller 32 determines whether the air conditioner 1 satisfies the first preset sub-condition. For example, the controller 32 determines whether the accumulated operation time of the compressor 11 reaches a second preset time (e.g., 20 minutes), and when it is determined that the accumulated operation time of the compressor 11 reaches the second preset time, the controller 32 determines whether a first temperature difference between the ambient temperature and the temperature of the indoor heat exchanger 21 satisfies a preset temperature difference (e.g., 2° C.).

In some embodiments, the controller 32 includes a timer 321. The timer 321 can time the operating state of the compressor 11 to obtain the accumulated operation time of the compressor 11. The ambient temperature sensor 41 sends the detected ambient temperature to the controller 32, the temperature sensor 42 of the indoor heat exchanger 21 sends the detected temperature of the indoor heat exchanger 21 to the controller 32, and the controller 32 calculates the first temperature difference between the ambient temperature and the temperature of the indoor heat exchanger 21.

A method by which the controller 32 determines whether the air conditioner 1 satisfies the second preset sub-condition or the third preset sub-condition is substantially the same as the method by which the controller 32 determines whether the air conditioner 1 satisfies the first preset sub-condition. The difference is that the controller 32 determines whether the accumulated operation time of the compressor 11 reaches a fourth preset time (e.g., 15 minutes) under the second preset sub-condition and determines whether the accumulated operation time of the compressor 11 reaches a sixth preset time (e.g., 10 minutes) under the third preset sub-condition.

When the controller 32 determines whether the air conditioner 1 satisfies the first preset sub-condition, the second preset sub-condition, and the third preset sub-condition, the second preset time, the fourth preset time, and the sixth preset time satisfy the following relation: the second preset time is greater than the fourth preset time, and the fourth preset time is greater than the sixth preset time. As a result, the total accumulated operation time of the compressor 11 is reduced, and thus the accuracy of determining whether the air conditioner 1 satisfies the first preset sub-condition, the second preset sub-condition, and the third preset sub-condition may be improved.

For example, the total accumulated operation time of the compressor 11 under the preset condition does not exceed 2 hours.

It can be understood that, if the air conditioner 1 does not satisfy any of the above preset sub-conditions, it is considered that there is no risk of refrigerant leakage on the compressor 11; and if the air conditioner 1 satisfies all the above preset sub-conditions, it is considered that the compressor 11 may be at risk of refrigerant leakage, in this case, the controller 32 needs to control the air conditioner 1 to continue to perform the corresponding control strategy, so as to further detect the refrigerant leakage of the compressor 11.

It will be noted that in the process of determining whether the accumulated operation time of the compressor 11 reaches the second preset time, the fourth preset time, or the sixth preset time, it is necessary to detect the operating state of the compressor 11 every other interval.

For example, the operating state of the compressor 11 will be detected every other 5 minutes, so that the timer 321 stops timing when the compressor 11 is turned off and starts timing or keeps timing when the compressor 11 is turned on. Therefore, the cycle logic determination of the compressor 11 is increased, which is conducive to improving the accuracy of determining the accumulated operation time of compressor 11.

For example, the user may send out the cooling or dehumidification instruction through an air conditioner remote control. Alternatively, the user may send out the cooling or dehumidification instruction through a relevant button on the operation interface of the air conditioner 1, which is not limited in the present disclosure.

After the air conditioner 1 receives the cooling or dehumidification instruction, the controller 32 controls the air conditioner 1 to operate in the cooling operation or dehumidification operation and controls the air conditioner 1 to perform the first control strategy in the cooling or dehumidification process to determine whether the air conditioner 1 satisfies the preset condition, so as to control the process of detecting the refrigerant leakage of the compressor 11 accordingly.

In step 2, if the air conditioner 1 satisfies the first preset sub-condition, the second preset sub-condition, and the third preset sub-condition, the controller 32 controls the air conditioner 1 to perform a preset second control strategy for the first time.

In some embodiments, in the determination process of the first preset sub-condition, the second preset sub-condition, and the third preset sub-condition, if the accumulated operation times of the compressor 11 reach the second preset time, the fourth preset time, and the sixth preset time respectively, and the temperature differences each between the ambient temperature and the temperature of the indoor heat exchanger 21 are less than or equal to the preset temperature difference (e.g., 2° C.), it is considered that the air conditioner 1 satisfies the first preset sub-condition, the second preset sub-condition, and the third preset sub-condition.

In this case, it is considered that the air conditioner 1 may have the risk of refrigerant leakage. Therefore, instead of detecting the temperature difference between the ambient temperature and the temperature of the indoor heat exchanger 21, the controller 32 controls the air conditioner 1 to perform the preset second control strategy for the first time, so that the air conditioner 1 operates normally for the eighth preset time (e.g., 90 minutes) in the cooling operation or the dehumidification operation. In this way, the operation stability of the air conditioner 1 may increase, and the influence of the air conditioner 1 on the detection result of the temperature difference under the special operating conditions (for example, the ambient temperature being greater than 30° C.) may be reduced, which is conducive to improving the accuracy of detecting the refrigerant leakage.

In step 3, after the second control strategy has been performed for the first time, the controller 32 controls the air conditioner 1 to perform the first control strategy for a second time to determine whether the air conditioner 1 satisfies the first preset sub-condition, the second preset sub-condition, and the third preset sub-condition for a second time.

In some embodiments, after the controller 32 has performed the first control strategy and the second control strategy, the controller 32 determines that the compressor 11 may have the risk of refrigerant leakage. In this case, in order to reduce the probability of false alarm, the air conditioner 1 may not immediately send out a fault alarm signal (which may, for example, be sent out by the alarm of air conditioner 1) indicating that there may be refrigerant leakage. The controller 32 may control the air conditioner 1 to perform the first control strategy for the second time to determine whether the air conditioner 1 satisfies the first preset sub-condition, the second preset sub-condition, and the third preset sub-condition.

The method for the controller 32 to determine whether the air conditioner 1 satisfies the first preset sub-condition, the second preset sub-condition, and the third preset sub-condition is the same as the above descriptions, and details will not be repeated here.

In step 4, if the air conditioner 1 satisfies the first preset sub-condition, the second preset sub-condition, and the third preset sub-condition for the second time, the controller 32 controls the air conditioner 1 to send out alarm information indicating that there may be refrigerant leakage. For example, the controller 32 controls the display device 24 to display the blinking fault code corresponding to refrigerant leakage.

In some embodiments, when the air conditioner 1 performs the first control strategy for the second time, if the accumulated operation times of the compressor 11 under the respective preset sub-conditions reach the preset time, and the temperature differences each between the ambient temperature and the temperature of the indoor heat exchanger 21 are less than or equal to the preset temperature difference, it is considered that the air conditioner 1 satisfies the preset condition again.

In this case, it is considered that the compressor 11 is likely to have the risk of refrigerant leakage. In this case, the display device 24 of the air conditioner 1 may be controlled to display the blinking fault code (e.g., E9) to remind the user that the compressor 11 is likely to have the risk of refrigerant leakage, so that the user may take timely response measures (e.g., turn off the air conditioner 1).

In the method for detecting refrigerant leakage in some embodiments of the present disclosure, the controller 32 controls the air conditioner 1 to perform the first control strategy for the first time to determine whether the air conditioner 1 satisfies the first preset sub-condition, the second preset sub-condition, and the third preset sub-condition in the process of controlling the air conditioner 1 to operate in the cooling operation or the dehumidification operation. When it is determined that the air conditioner 1 satisfies the preset condition, the controller 32 controls the air conditioner 1 to perform the second control strategy for the first time, so that the cycle logic determination and the operation time of air conditioner 1 may increase, the operation stability of the air conditioner 1 may be improved, and the influence of the air conditioner 1 on the detection result of the temperature difference under the special operating conditions may be reduced, which is conducive to improving the accuracy of detecting the refrigerant leakage.

In addition, after the second control strategy has been performed for the first time, the controller 32 controls the air conditioner 1 to perform the first control strategy again to determine whether the air conditioner 1 satisfies the preset condition again. In a case where the air conditioner 1 satisfies the preset condition again, the controller 32 controls the air conditioner 1 to send out the alarm information indicating that there may be refrigerant leakage. For example, the controller 32 controls the display device 24 to display the blinking fault code corresponding to the refrigerant leakage to remind the user that the compressor 11 is likely to have the risk of refrigerant leakage, so that the user may take timely response measures. In this way, the false alarm rate may be reduced effectively and the accuracy of detecting the refrigerant leakage may be improved.

In some embodiments, after the controller 32 controls the air conditioner 1 to send out the alarm information indicating that there may be refrigerant leakage, the method for detecting refrigerant leakage further includes: the controller 32 controlling the air conditioner 1 to perform the first control strategy for a third time to determine whether the air conditioner 1 satisfies the first preset sub-condition, the second preset sub-condition, and the third preset sub-condition for a third time.

If the air conditioner 1 satisfies the first preset sub-condition, the second preset sub-condition, and the third preset sub-condition for the third time, the controller 32 controls the air conditioner 1 to perform the second control strategy for a second time.

After the second control strategy has been performed for the second time, the controller 32 controls the air conditioner 1 to perform the first control strategy for a fourth time to determine whether the air conditioner 1 satisfies the first preset sub-condition, the second preset sub-condition, and the third preset sub-condition for a fourth time.

If the air conditioner 1 satisfies the first preset sub-condition, the second preset sub-condition, and the third preset sub-condition for the fourth time, the controller 32 may determine the presence of the refrigerant leakage.

In this case, the air conditioner 1 performs the final fault protection mode, that is, the controller 32 controls the air conditioner 1 to stop. For example, the controller 32 controls the compressor 11 to stop, controls the display device 24 to constantly display a fault code, controls the first fan 22 of the air conditioner 1 to stop, and controls the second fan 14 of the air conditioner 1 to operate at a rated minimum speed for a first preset time (e.g., 5 minutes) and then stop.

After it is determined that the compressor 11 has the refrigerant leakage, the controller 32 controls the second fan 14 to continue to operate for a period of time, so that the heat in the box body 1001 of the air conditioner 1 may be quickly reduced, so as to avoid the damage of the compressor 11 caused by too high temperature and improve the operation safety of the compressor 11.

In addition, after displaying the blinking fault code corresponding to the refrigerant leakage on the display device 24 of the air conditioner 1, the controller 32 controls the air conditioner 1 to perform the first control strategy and the second control strategy again, which increases the cycle logic determination and the operation time of the air conditioner 1 again. As a result, the accuracy of detecting refrigerant leakage of the compressor 11 may be improved.

In some embodiments, the first control strategy includes that the controller 32 determines whether the compressor 11 is turned on. If the compressor 11 is turned on, the controller 32 determines whether the air conditioner 1 satisfies the first preset sub-condition when the compressor 11 operates for the second preset time accumulatively.

If the air conditioner 1 satisfies the first preset sub-condition, the controller 32 controls the compressor 11 to stop for a third preset time, and the controller 32 €4 determines whether the compressor 11 is turned on after the third preset time. If the compressor 11 is turned on, the controller 32 determines whether the air conditioner 1 satisfies the second preset sub-condition when the compressor 11 operates for the fourth preset time accumulatively.

If the air conditioner 1 satisfies the second preset sub-condition, the controller 32 controls the compressor 11 to stop for a fifth preset time, and the controller 32 determines whether the compressor 11 is turned on after the fifth preset time. If the compressor 11 is turned on, the controller 32 determines whether the air conditioner 1 satisfies the third preset sub-condition when the compressor 11 operates for the sixth preset time accumulatively.

If the air conditioner 1 satisfies the third preset sub-condition, the controller 32 controls the compressor 11 to stop for a seventh preset time.

In some embodiments, when the controller 32 controls the air conditioner 1 to perform the first control strategy, it is necessary to determine whether the compressor 11 is turned on. If the compressor 11 is turned on, the timer 321 starts timing the operating time of the compressor 11. During the operation of the compressor 11, the controller 32 detects the operating state of the compressor 11 every other interval (e.g., every other 5 minutes), so as to determine the current operating state of the compressor 11. When the compressor 11 accumulatively operates for the second preset time (e.g., 20 minutes), the controller 32 determines whether the air conditioner 1 satisfies the first preset sub-condition.

If the air conditioner 1 satisfies the first preset sub-condition, the controller 32 controls the compressor 11 to stop for the third preset time (for example, control the compressor 11 to stop for 3 minutes), and determines the operating state of the compressor 11 after the compressor 11 has been stopped for the third preset time. That is, the controller 32 determines whether the compressor 11 is turned on. If the compressor 11 is turned on, the timer 321 starts timing, and the controller 32 detects the operating state of the compressor 11 every other interval (e.g., every other 5 minutes) during the operating of the compressor 11, so as to determine the current operating state of the compressor 11. When the compressor 11 accumulatively operates for the fourth preset time (e.g., 15 minutes), the controller 32 determines whether the air conditioner 1 satisfies the second preset sub-condition.

If the air conditioner 1 satisfies the second preset sub-condition, the controller 32 controls the compressor 11 to stop for the fifth preset time (e.g., 3 minutes) and determines whether the compressor 11 is turned on after the compressor 11 has been controlled to stop for the fifth preset time. If the compressor 11 is turned on, the timer 321 starts timing. During the operating of the compressor 11, the controller 32 detects the operating state of the compressor 11 every other interval (e.g., every other 5 minutes) to determine the current operating state of the compressor 11. When the compressor 11 accumulatively operates for the sixth preset time (e.g., 10 minutes), the controller 32 determines whether the air conditioner 1 satisfies the third preset sub-condition.

If the air conditioner 1 satisfies the third preset sub-condition, the controller 32 controls the compressor 11 to stop for the seventh preset time (e.g., 3 minutes).

It will be noted that the third preset time, the fifth preset time, and the seventh preset time may be equal or unequal. For example, the third preset time, the fifth preset time, and the seventh preset time may all be 3 minutes. Alternatively, the third preset time may be 3 minutes, the fifth preset time may be 4 minutes, and the seventh preset time may be 5 minutes.

It can be understood that the compressor 11 does not need to operate continuously during the period when the compressor 11 accumulatively operates for the second preset time, the fourth preset time, and the sixth preset time. That is, the compressor 11 may be turned off without being always turned on, and the timer 321 stops timing when the compressor 11 is turned off. During the operating of the compressor 11, the compressor 11 needs to be in a turned-on state when the operating state of the compressor 11 is detected every other 5 minutes.

In some embodiments, the controller 32 obtains the first temperature difference between the ambient temperature and the temperature of the indoor heat exchanger 21 every other preset interval (e.g., 30 seconds, 60 seconds or 90 seconds) after the compressor 11 accumulatively operates for the second preset time (e.g., 20 minutes). In a case where the first temperature differences obtained for consecutive preset times (e.g., 3, 4, or 5 times) are each less than or equal to the preset temperature difference (e.g., 2° C.), it is determined that the air conditioner 1 satisfies the first preset sub-condition.

It can be understood that the air conditioner 1 has an uncertain operating environment, which may affect the accuracy of the temperature detected by the temperature sensors (e.g., the ambient temperature sensor 41 and the temperature sensor 42). Therefore, by setting the preset interval to 30 seconds, 60 seconds, or 90 seconds, it may prevent the temperature sensor from continuously detecting inaccurate temperatures for many times in a short time, which is conducive to improving the accuracy of detecting refrigerant leakage.

The method for determining whether the air conditioner 1 satisfies the second or third preset sub-condition is substantially same as the method for determining whether the air conditioner 1 satisfies the first preset sub-condition, and the difference is that it is determined whether the accumulated operation time of the compressor 11 reaches the fourth preset time (e.g., 15 minutes) under the second preset sub-condition, and whether the accumulated operation time of the compressor 11 reaches the sixth preset time (e.g., 10 minutes) under the third preset sub-condition.

It will be noted that, the indoor ambient temperature and the temperature of the indoor heat exchanger 21 are both detected for many consecutive times, the temperature difference between the indoor ambient temperature and the temperature of the indoor heat exchanger 21 is calculated, and the relationship between the temperature difference and the preset temperature difference is determined for many consecutive times. As a result, it may be determined whether the air conditioner 1 satisfies the preset condition, thereby improving the accuracy of determination of the preset condition.

It can be understood that the second preset time, the fourth preset time, and the sixth preset time are gradually reduced, so as to reduce the total accumulated operating time of the compressor 11. As a result, the accuracy of determining whether the air conditioner 1 satisfies the first preset sub-condition, the second preset sub-condition, and the third preset sub-condition may be improved.

In some embodiments, the second control strategy includes: controlling the air conditioner 1 to operate normally for an eighth preset time. The eighth preset time is greater than any one of the first preset time to the seventh preset time.

It can be understood that when the controller 32 controls the air conditioner 1 to perform the second control strategy, the controller 32 may control the air conditioner 1 to operate normally for the eighth preset time. For example, the controller 32 controls the air conditioner 1 to operate in the cooling operation or the dehumidification operation for 90 minutes. Therefore, the operation stability of the air conditioner 1 may increase, and the influence of the air conditioner 1 on the detection result of the temperature difference under the special operating conditions may be reduced, which is conducive to improving the accuracy of detecting the refrigerant leakage.

In some embodiments, the first control strategy further includes that if it is determined that the air conditioner 1 does not satisfy at least one of the first preset sub-condition, the second preset sub-condition, or the third preset sub-condition, the first control strategy is re-performed.

For example, in a case where the temperature difference (e.g., 3° C., 4° C., or 5° C.) between the ambient temperature and the temperature of the indoor heat exchanger 21 is greater than the preset temperature difference (e.g., 2° C.) during the performing of the first control strategy by the air conditioner 1, the controller 32 controls the air conditioner 1 to re-perform the first control strategy instead of continuing to perform the previous control strategy, thereby improving the accuracy of detecting the refrigerant leakage.

In some embodiments, the first control strategy further includes that the controller 32 re-performs the first control strategy when the air conditioner 1 receives a power-off instruction, a turned-off instruction, or a preset mode switching instruction.

For example, the controller 32 controls the air conditioner 1 to re-perform the first control strategy when the controller 32 receives an air supply instruction or a heating instruction. In this way, the false alarm of refrigerant leakage caused by the controller continuing to perform the previous control strategy may be avoided, and the accuracy of detecting the refrigerant leakage may be improved.

Some embodiments of the present disclosure detect the refrigerant leakage according to the flow chart of the method for detecting refrigerant leakage shown in FIGS. 4a to 4f, and the method includes steps 101 to 245.

In step 101, the air conditioner 1 operates in the cooling operation or the dehumidification operation.

In step 102, it is determined whether the compressor 11 is turned on. If so, step 103 is performed. If not, timing is not performed.

In step 103, the compressor 11 is turned on, and timing is started.

In step 104, it is detected whether the compressor 11 operates every other 5 minutes. If so, step 105 is performed. If not, step 113 is performed.

In step 105, timing is continued.

In step 106, it is determined whether the accumulated operating time of the compressor 11 reaches 20 minutes. If so, step 107 is performed. If not, step 104 is performed.

In step 107, it is determined whether the first temperature difference between the ambient temperature and the temperature of the indoor heat exchanger 21 is less than or equal to the preset temperature difference. If so, step 108 is performed. If not, step 102 is re-performed.

In step 108, a step 109 is performed after a delay for 30 seconds.

In step 109, it is determined whether the first temperature difference between the ambient temperature and the temperature of the indoor heat exchanger 21 is less than or equal to the preset temperature difference. If so, step 110 is performed. If not, step 102 is re-performed.

In step 110, a step 111 is performed after a delay for 30 seconds.

In step 111, it is determined whether the first temperature difference between the ambient temperature and the temperature of the indoor heat exchanger 21 is less than or equal to the preset temperature difference. If so, step 112 is performed. If not, step 102 is re-performed.

In step 112, the compressor 11 is controlled to stop for 3 minutes.

In step 113, timing is stopped, and step 104 is re-performed.

In step 114, it is determined whether the compressor 11 is turned on. If so, step 115 is performed. If not, timing is not performed.

In step 115, the compressor 11 is turned on, and timing is started.

In step 116, it is detected whether the compressor 11 operates every other 5 minutes. If so, step 117 is performed. If not, step 125 is performed.

In step 117, timing is continued.

In step 118, it is determined whether the accumulated operating time of the compressor 11 reaches 15 minutes. If so, step 119 is performed. If not, step 116 is performed.

In step 119, it is determined whether a second temperature difference between the ambient temperature and the temperature of the indoor heat exchanger 21 is less than or equal to the preset temperature difference. If so, step 120 is performed. If not, step 102 is re-performed.

In step 120, a step 121 is performed after a delay for 30 seconds.

In step 121, it is determined whether the second temperature difference between the ambient temperature and the temperature of the indoor heat exchanger 21 is less than or equal to the preset temperature difference. If so, step 122 is performed. If not, step 102 is re-performed.

In step 122, a step 123 is performed after a delay for 30 seconds.

In step 123, it is determined whether the second temperature difference between the ambient temperature and the temperature of the indoor heat exchanger 21 is less than or equal to the preset temperature difference. If so, step 124 is performed. If not, step 102 is re-performed.

In step 124, the compressor 11 is stopped for 3 minutes.

In step 125, timing is stopped, and step 116 is re-performed.

In step 126, it is determined whether the compressor 11 is turned on. If so, step 127 is performed. If not, timing is not performed.

In step 127, the compressor 11 is turned on, and timing is started.

In step 128, it is detected whether the compressor 11 operates every other 5 minutes. If so, step 129 is performed. If not, step 138 is performed.

In step 129, timing is continued.

In step 130, it is determined whether the accumulated operating time of the compressor 11 reaches 10 minutes. If so, step 131 is performed. If not, step 128 is performed.

In step 131, it is determined whether a third temperature difference between the ambient temperature and the temperature of the indoor heat exchanger 21 is less than or equal to the preset temperature difference. If so, step 132 is performed. If not, step 102 is re-performed.

In step 132, a step 133 is performed after a delay for 30 seconds.

In step 133, it is determined whether the third temperature difference between the ambient temperature and the temperature of the indoor heat exchanger 21 is less than or equal to the preset temperature difference. If so, step 134 is performed. If not, step 102 is re-performed.

In step 134, a step 135 is performed after a delay for 30 seconds.

In step 135, it is determined whether the third temperature difference between the ambient temperature and the temperature of the indoor heat exchanger 21 is less than or equal to the preset temperature difference. If so, step 136 is performed. If not, step 102 is re-performed.

In step 136, the compressor 11 is stopped for 3 minutes.

In step 137, the air conditioner 1 operates normally for 90 minutes.

In step 138, timing is stopped, and step 128 is re-performed.

In step 139, it is determined whether the compressor 11 is turned on. If so, step 140 is performed. If not, timing is not performed.

In step 140, the compressor 11 is turned on, and timing is started.

In step 141, it is detected whether the compressor 11 operates every other 5 minutes. If so, step 142 is performed. If not, step 150' is performed.

In step 142, timing is continued.

In step 143, it is determined whether the accumulated operating time of the compressor 11 reaches 20 minutes. If so, step 144 is performed. If not, step 141 is performed.

In step 144, it is determined whether the first temperature difference between the ambient temperature and the temperature of the indoor heat exchanger 21 is less than or equal to the preset temperature difference. If so, step 145 is performed. If not, step 102 is re-performed.

In step 145, a step 146 is performed after a delay for 30 seconds.

In step 146, it is determined whether the first temperature difference between the ambient temperature and the temperature of the indoor heat exchanger 21 is less than or equal to the preset temperature difference. If so, step 147 is performed. If not, step 102 is re-performed.

In step 147, a step 148 is performed after a delay for 30 seconds.

In step 148, it is determined whether the first temperature difference between the ambient temperature and the temperature of the indoor heat exchanger 21 is less than or equal to the preset temperature difference. If so, step 149 is performed. If not, step 102 is re-performed.

In step 149, the compressor 11 is stopped for 3 minutes.

In step 150', timing is stopped, and step 141 is re-performed.

In step 150, it is determined whether the compressor 11 is turned on. If so, step 151 is performed. If not, timing is not performed.

In step 151, the compressor 11 is turned on, and timing is not performed.

In step 152, it is detected whether the compressor 11 operates every other 5 minutes. If so, step 153 is performed. If not, step 161 is performed.

In step 153, timing is continued.

In step 154, it is determined whether the accumulated operating time of the compressor 11 reaches 15 minutes. If so, step 155 is performed. If not, step 152 is performed.

In step 155, it is determined whether the second temperature difference between the ambient temperature and the temperature of the indoor heat exchanger 21 is less than or equal to the preset temperature difference. If so, step 156 is performed. If not, step 102 is re-performed.

In step 156, a step 157 is performed after a delay for 30 seconds.

In step 157, it is determined whether the second temperature difference between the ambient temperature and the temperature of the indoor heat exchanger 21 is less than or equal to the preset temperature difference. If so, step 158 is performed. If not, step 102 is re-performed.

In step 158, a step 159 is performed after a delay for 30 seconds.

In step 159, it is determined whether the second temperature difference between the ambient temperature and the temperature of the indoor heat exchanger 21 is less than or equal to the preset temperature difference. If so, step 160 is performed. If not, step 102 is re-performed.

In step 160, the compressor 11 is stopped for 3 minutes.

In step 161, timing is stopped, and step 152 is re-performed.

In step 162, it is determined whether the compressor 11 is turned on. If so, step 163 is performed. If not, timing is not performed.

In step 163, the compressor 11 is turned on, and timing is started.

In step 164, it is detected whether the compressor 11 operates every other 5 minutes. If so, step 165 is performed. If not, step 174 is performed.

In step 165, timing is continued.

In step 166, it is determined whether the accumulated operating time of the compressor 11 reaches 10 minutes. If so, step 167 is performed. If not, step 164 is performed.

In step 167, it is determined whether the third temperature difference between the ambient temperature and the temperature of the indoor heat exchanger 21 is less than or equal to the preset temperature difference. If so, step 168 is performed. If not, step 102 is re-performed.

In step 168, a step 169 is performed after a delay for 30 seconds.

In step 169, it is determined whether the third temperature difference between the ambient temperature and the temperature of the indoor heat exchanger 21 is less than or equal to the preset temperature difference. If so, step 170 is performed. If not, step 102 is re-performed.

In step 170, a step 171 is performed after a delay for 30 seconds.

In step 171, it is determined whether the third temperature difference between the ambient temperature and the temperature of the indoor heat exchanger 21 is less than or equal to the preset temperature difference. If so, step 172 is performed. If not, step 102 is re-performed.

In step 172, the compressor 11 is stopped fora minutes.

In step 173, the display device 24 displays the blinking fault code.

In step 174, timing is stopped, and step 164 is re-performed.

In step 175, it is determined whether the compressor 11 is turned on. If so, step 176 is performed. If not, timing is not performed.

In step 176, the compressor 11 is turned on, and timing is started.

In step 177, it is detected whether the compressor 11 operates every other 5 minutes. If so, step 178 is performed. If not, step 186 is performed.

In step 178, timing is continued.

In step 179, it is determined whether the accumulated operating time of the compressor 11 reaches 20 minutes. If so, step 180 is performed. If not, step 177 is performed.

In step 180, it is determined whether the first temperature difference between the ambient temperature and the temperature of the indoor heat exchanger 21 is less than or equal to the preset temperature difference. If so, step 181 is performed. If not, step 102 is re-performed.

In step 181, a step 182 is performed after a delay for 30 seconds.

In step 182, it is determined whether the first temperature difference between the ambient temperature and the temperature of the indoor heat exchanger 21 is less than or equal to the preset temperature difference. If so, step 183 is performed. If not, step 102 is re-performed.

In step 183, a step 184 is performed after a delay for 30 seconds.

In step 184, it is determined whether the first temperature difference between the ambient temperature and the temperature of the indoor heat exchanger 21 is less than or equal to the preset temperature difference. If so, step 185 is performed. If not, step 102 is re-performed.

In step 185, the compressor 11 is stopped for 3 minutes.

In step 186, timing is stopped, and step 177 is re-performed.

In step 187, it is determined whether the compressor 11 is turned on. If so, step 188 is performed. If not, timing is not performed.

In step 188, the compressor 11 is turned on, and timing is started.

In step 189, it is detected whether the compressor 11 operates every other 5 minutes. If so, step 190 is performed. If not, step 198 is performed.

In step 190, timing is continued.

In step 191 it is determined whether the accumulated operating time of the compressor 11 reaches 15 minutes. If so, step 192 is performed. If not, step 189 is performed.

In step 192, it is determined whether the second temperature difference between the ambient temperature and the temperature of the indoor heat exchanger 21 is less than or equal to the preset temperature difference. If so, step 193 is performed. If not, step 102 is re-performed.

In step 193, a step 194 is performed after a delay for 30 seconds.

In step 194, it is determined whether the second temperature difference between the ambient temperature and the temperature of the indoor heat exchanger 21 is less than or equal to the preset temperature difference. If so, step 195 is performed. If not, step 102 is re-performed.

In step 195, a step 196 is performed after a delay for 30 seconds.

In step 196, it is determined whether the second temperature difference between the ambient temperature and the temperature of the indoor heat exchanger 21 is less than or equal to the preset temperature difference. If so, step 197 is performed. If not, step 102 is re-performed.

In step 197, the compressor 11 is stopped for 3 minutes.

In step 198, timing is stopped, and step 189 is re-performed.

In step 199, it is determined whether the compressor 11 is turned on. If so, step 200 is performed. If not, timing is not performed.

In step 200, the compressor 11 is turned on, and timing is started.

In step 201, it is detected whether the compressor 11 operates every other 5 minutes. If so, step 202 is performed. If not, step 211 is performed.

In step 202, timing is continued.

In step 203, it is determined whether the accumulated operating time of the compressor 11 reaches 10 minutes. If so, step 204 is performed. If not, step 201 is performed.

In step 204, it is determined whether the third temperature difference between the ambient temperature and the temperature of the indoor heat exchanger 21 is less than or equal to the preset temperature difference. If so, step 205 is performed. If not, step 102 is re-performed.

In step 205, a step 206 is performed after a delay for 30 seconds.

In step 206, it is determined whether the third temperature difference between the ambient temperature and the temperature of the indoor heat exchanger 21 is less than or equal to the preset temperature difference. If so, step 207 is performed. If not, step 102 is re-performed.

In step 207, a step 208 is performed after a delay for 30 seconds.

In step 208, it is determined whether the third temperature difference between the ambient temperature and the temperature of the indoor heat exchanger 21 is less than or equal to the preset temperature difference. If so, step 209 is performed. If not, step 102 is re-performed.

In step 209, the compressor 11 is stopped for 3 minutes.

In step 210, the air conditioner 1 operates normally for 90 minutes.

In step 211, timing is stopped, and step 201 is re-performed.

In step 212, it is determined whether the compressor 11 is turned on. If so, step 213 is performed. If not, timing is not performed.

In step 213, the compressor 11 is turned on, and timing is started.

In step 214, it is detected whether the compressor 11 operates every other 5 minutes. If so, step 215 is performed. If not, step 222' is performed.

In step 215, timing is continued.

In step 216, it is determined whether the accumulated operating time of the compressor 11 reaches 20 minutes. If so, step 217 is performed. If not, step 214 is performed.

In step 217, it is determined whether the first temperature difference between the ambient temperature and the temperature of the indoor heat exchanger 21 is less than or equal to the preset temperature difference. If so, step 218 is performed. If not, step 102 is re-performed.

In step 218, a step 219 is performed after a delay for 30 seconds.

In step 219, it is determined whether the first temperature difference between the ambient temperature and the temperature of the indoor heat exchanger 21 is less than or equal to the preset temperature difference. If so, step 220 is performed. If not, step 102 is re-performed.

In step 220, a step 221 is performed after a delay for 30 seconds.

In step 221 it is determined whether the first temperature difference between the ambient temperature and the temperature of the indoor heat exchanger 21 is less than or equal to the preset temperature difference. If so, step 222 is performed. If not, step 102 is re-performed.

In step 222, the compressor 11 is stopped for 3 minutes.

In step 222', timing is stopped, and step 214 is re-performed.

In step 223, it is determined whether the compressor 11 is turned on. If so, step 224 is performed. If not, timing is not performed.

In step 224, the compressor 11 is turned on, and timing is started.

In step 225, it is detected whether the compressor 11 operates every other 5 minutes. If so, step 226 is performed. If not, step 234 is performed.

In step 226, timing is continued.

In step 227, it is determined whether the accumulated operating time of the compressor 11 reaches 15 minutes. If so, step 228 is performed. If not, step 225 is performed.

In step 228, it is determined whether the second temperature difference between the ambient temperature and the temperature of the indoor heat exchanger 21 is less than or equal to the preset temperature difference. If so, step 229 is performed. If not, step 102 is re-performed.

In step 229, a step 230 is performed after a delay for 30 seconds.

In step 230, it is determined whether the second temperature difference between the ambient temperature and the temperature of the indoor heat exchanger 21 is less than or equal to the preset temperature difference. If so, step 231 is performed. If not, step 102 is re-performed.

In step 231, a step 232 is performed after a delay for 30 seconds.

In step 232, it is determined whether the second temperature difference between the ambient temperature and the temperature of the indoor heat exchanger 21 is less than or equal to the preset temperature difference. If so, step 233 is performed. If not, step 102 is re-performed.

In step 233, the compressor 11 is stopped for 3 minutes.

In step 234, timing is stopped, and step 225 is re-performed.

In step 235, it is determined whether the compressor 11 is turned on. If so, step 236 is performed. If not, timing is not performed.

In step 236, the compressor 11 is turned on, and timing is started.

In step 237, it is detected whether the compressor 11 operates every other 5 minutes. If so, step 238 is performed. If not, step 246 is performed.

In step 238, timing is continued.

In step 239, it is determined whether the accumulated operating time of the compressor 11 reaches 10 minutes. If so, step 240 is performed. If not, step 237 is performed.

In step 240, it is determined whether the third temperature difference between the ambient temperature and the temperature of the indoor heat exchanger 21 is less than or equal to the preset temperature difference. If so, step 241 is performed. If not, step 102 is re-performed.

In step 241, a step 242 is performed after a delay for 30 seconds.

In step 242, it is determined whether the third temperature difference between the ambient temperature and the temperature of the indoor heat exchanger 21 is less than or equal to the preset temperature difference. If so, step 243 is performed. If not, step 102 is re-performed.

In step 243, a step 244 is performed after a delay for 30 seconds.

In step 244, it is determined whether the third temperature difference between the ambient temperature and the temperature of the indoor heat exchanger 21 is less than or equal to the preset temperature difference. If so, step 245 is performed. If not, step 102 is re-performed.

In step 245, it is determined that the refrigerant leakage occurs, the compressor 11 is controlled to stop, the display device 24 is controlled to display the fault code constantly, and the first fan 22 is controlled to stop. In this case, the second fan 14 operates at the rated minimum speed for the first preset time and then stops.

In step 246, timing is stopped, and step 237 is re-performed.

In the method for detecting refrigerant leakage in some embodiments of the present disclosure, in the process of controlling the air conditioner 1 to operate in the cooling operation or the dehumidification operation, the controller 32 controls the air conditioner 1 to perform the first control strategy for the first time to determine whether the air conditioner 1 satisfies the first preset sub-condition, the second preset sub-condition, and the third preset sub-condition. When it is determined that the air conditioner 1 satisfies the preset condition, the controller 32 controls the air conditioner 1 to perform the second control strategy for the first time. Therefore, the cycle logic determination and the operation time of the air conditioner 1 may increase, and the operation stability of the air conditioner 1 may be improved.

After the second control strategy has been performed for the first time, the controller 32 controls the air conditioner 1 to perform the first control strategy again to determine whether the air conditioner 1 satisfies the preset condition again. In the case where the air conditioner 1 satisfies the preset condition again, the controller 32 controls the display device 24 to display the fault code corresponding to the refrigerant leakage to remind the user that the compressor 11 may have the risk of refrigerant leakage, so that the user may take timely response measures. In this way, the false alarm rate may be reduced effectively and the accuracy of detecting the refrigerant leakage may be improved.

Figure 5:
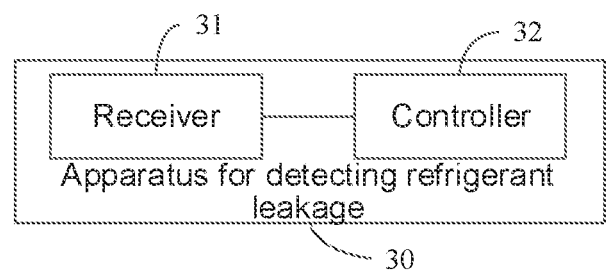
FIG. 5 is a block diagram of an apparatus for detecting refrigerant leakage, in accordance with some embodiments.

Some embodiments of the present disclosure further provide an apparatus for detecting refrigerant leakage. As shown in FIG. 5, the apparatus 30 for detecting refrigerant leakage includes a receiver 31 and a controller 32.

The receiver 31 is configured to receive a cooling instruction or a dehumidification instruction sent by a user. For example, the receiver 31 is an infrared receiver for receiving the cooling instruction or the dehumidification instruction sent by the user through a remote controller.

The controller 32, such as a micro control unit (MCU) controller, is configured to control the air conditioner 1 to perform the cooling operation or the dehumidification operation according to the cooling or dehumidification instruction, and in the cooling or dehumidification process of the air conditioner 1, control the air conditioner 1 to perform the preset first control strategy for the first time to determine whether the air conditioner 1 satisfies the first preset sub-condition, the second preset sub-condition and the third preset sub-condition; control the air conditioner 1 to perform the preset second control strategy for the first time in a case where the air conditioner 1 satisfies the first preset sub-condition, the second preset sub-condition, and the third preset sub-condition; control the air conditioner 1 to perform the first control strategy for the second time to determine whether the air conditioner 1 satisfies the first preset sub-condition, the second preset sub-condition, and the third preset sub-condition for the second time after the second control strategy has been performed for the first time; and control the display device 24 to display the blinking fault code corresponding to the refrigerant leakage in a case where the air conditioner 1 satisfies the first preset sub-condition, the second preset sub-condition, and the third preset sub-condition for the second time.

In some embodiments, the controller 32 is further configured to control the air conditioner 1 to perform the first control strategy for the third time to determine whether the air conditioner 1 satisfies the first preset sub-condition, the second preset sub-condition, and the third preset sub-condition for the third time; control the air conditioner 1 to perform the second control strategy for the second time if the air conditioner 1 satisfies the first preset sub-condition, the second preset sub-condition, and the third preset sub-condition for the third time; control the air conditioner 1 to perform the first control strategy for the fourth time to determine whether the air conditioner 1 satisfies the first preset sub-condition, the second preset sub-condition, and the third preset sub-condition for the fourth time after the second control strategy has been performed for the second time; and determine that the refrigerant leakage occurs if the air conditioner 1 satisfies the first preset sub-condition, the second preset sub-condition, and the third preset sub-condition for the fourth time. In this case, the controller 32 controls the compressor 11 to stop, controls the display device 24 to display the fault code constantly, controls the first fan 22 to stop, and controls the second fan 14 to operate at the rated minimum speed for the first preset time and then stop.

In some embodiments, after the display device 24 of the air conditioner 1 displays the blinking fault code corresponding to refrigerant leakage, the controller 32 controls the air conditioner 1 to perform the first control strategy for the third time to determine whether the air conditioner 1 satisfies the preset condition, and controls the air conditioner 1 to perform the second control strategy for the second time in the case where the air conditioner 1 satisfies the first preset sub-condition, the second preset sub-condition, and the third preset sub-condition for the third time.

After the second control strategy has been performed for the second time, the controller 32 controls the air conditioner 1 to perform the first control strategy for the fourth time to determine whether the air conditioner 1 satisfies the preset condition again. If the air conditioner 1 satisfies the preset condition, it is determined that the refrigerant leakage occurs in the compressor 11.

In this case, the controller 32 controls the air conditioner 1 to perform the final fault protection mode. For example, the controller 32 controls the compressor 11 to stop, and controls the display device 24 to display the fault code constantly.

In some embodiments, the first control strategy includes: determining whether the compressor 11 of the air conditioner 1 is turned on, and if the compressor 11 is turned on, determining whether the air conditioner 1 satisfies the first preset sub-condition when the compressor 11 operates for the second preset time accumulatively.

If the air conditioner 1 satisfies the first preset sub-condition, the controller 32 controls the compressor 11 to stop for the third preset time. After the third preset time, the controller 32 determines whether the compressor 11 is turned on. If the compressor 11 is turned on, the controller 32 determines whether the air conditioner 1 satisfies the second preset sub-condition when the compressor 11 operates for the fourth preset time accumulatively.

If the air conditioner 1 satisfies the second preset sub-condition, the controller 32 controls the compressor 11 to stop for the fifth preset time. After the fifth preset time, the controller 32 determines whether the compressor 11 is turned on. If the compressor 11 is turned on, the controller 32 determines whether the air conditioner 1 satisfies the third preset sub-condition when the compressor 11 operates for the sixth preset time accumulatively.

If the air conditioner 1 satisfies the third preset sub-condition, the controller 32 controls the compressor 11 to stop for the seventh preset time. The second preset time is greater than the fourth preset time, and the fourth preset time is greater than the sixth preset time.

In some embodiments, when the compressor 11 operates for the second preset time (e.g., 20 minutes) accumulatively, the controller 32 obtains the ambient temperature and the temperature of the indoor heat exchanger 21 respectively through the ambient temperature sensor and the temperature sensor of the indoor heat exchanger 21, and calculates the temperature difference, for example, the first temperature difference, between the ambient temperature and the temperature of the indoor heat exchanger 21. Then, the controller 32 determines the relationship between the first temperature difference and the preset temperature difference every other preset interval (e.g., every other 30 seconds). If the controller 32 determines the first temperature difference to be less than or equal to the preset temperature difference (e.g., 2° C.) for consecutive preset times (e.g., for 3 consecutive times), it is determined that the air conditioner 1 satisfies the first preset sub-condition.

When the compressor 11 operates for the fourth preset time (e.g., 15 minutes) accumulatively, the controller 32 obtains the ambient temperature and the temperature of the indoor heat exchanger 21 respectively through the ambient temperature sensor and the temperature sensor of the indoor heat exchanger 21, and calculates the temperature difference, for example, the second temperature difference, between the ambient temperature and the temperature of the indoor heat exchanger 21. Then, the controller 32 determines the relationship between the second temperature difference and the preset temperature difference every other preset interval (e.g., every other 30 seconds). If the controller 32 determines the second temperature difference to be less than or equal to the preset temperature difference (e.g., 2° C.) for consecutive preset times (e.g., for 3 consecutive times), it is determined that the air conditioner 1 satisfies the second preset sub-condition.

When the compressor 11 operates for the sixth preset time (e.g., 10 minutes) accumulatively, the controller 32 obtains the ambient temperature and the temperature of the indoor heat exchanger 21 respectively through the ambient temperature sensor and the temperature sensor of the indoor heat exchanger 21 and calculates the temperature difference, for example, the third temperature difference, between the ambient temperature and the temperature of the indoor heat exchanger 21. Then, the controller 32 determines the relationship between the third temperature difference and the preset temperature difference every other preset interval (e.g., every other 30 seconds). If the controller 32 determines the third temperature difference to be less than or equal to the preset temperature difference (e.g., 2° C.) for consecutive preset times (e.g., for 3 consecutive times), it is determined that the air conditioner 1 satisfies the third preset sub-condition.

The first temperature difference, the second temperature difference, and the third temperature difference may be equal or unequal.

In some embodiments, the second control strategy includes: controlling the air conditioner 1 to operate normally for the eighth preset time. The eighth preset time is greater than any one of the first preset time to the seventh preset time.

In some embodiments, the first control strategy further includes that the controller 32 controls the air conditioner 1 to re-perform the first control strategy if it is determined that the air conditioner 1 does not satisfy the at least one of the first preset sub-condition, the second preset sub-condition, and the third preset sub-condition.

In some embodiments, the first control strategy further includes that the controller 32 controls the air conditioner 1 to re-perform the first control strategy when the receiver 31 receives the power-off instruction, the turned-off instruction, or the preset mode switching instruction.

It will be noted that the implementation of the apparatus 30 for detecting refrigerant leakage in some embodiments of the present disclosure is similar to the implementation of the method for detecting refrigerant leakage in the above embodiments of the present disclosure, and details will not be repeated here.

Figure 6:
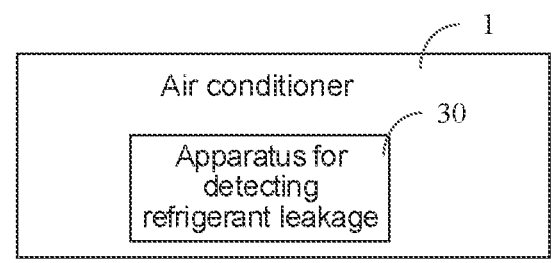
FIG. 6 is a block diagram of an air conditioner, in accordance with some embodiments.

Some embodiments of the present disclosure further provide an air conditioner 1, as shown in FIG. 6, the air conditioner 1 includes the apparatus 30 for detecting refrigerant leakage in any of the above embodiments.

Figure 7:
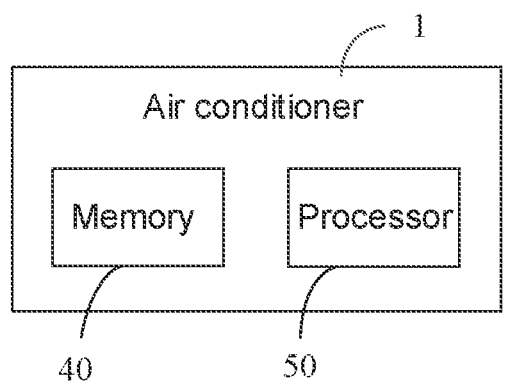
FIG. 7 is a block diagram of another air conditioner, in accordance with some embodiments.

As shown in FIG. 7, the air conditioner 1 includes a processor 50, a memory 40, and a program for detecting refrigerant leakage that is stored on the memory 40 and capable of running on the processor 50. When the program for detecting refrigerant leakage is run on the processor 50, the method for detecting refrigerant leakage as described in the above embodiment is implemented.

In some embodiments, the implementation of the air conditioner 1 detecting the refrigerant leakage is similar to the implementation of the apparatus 30 for detecting refrigerant leakage in any of the above embodiments of the present disclosure, and details will not be repeated here.

Some embodiments of the present disclosure provide a computer-readable storage medium (e.g., a non-transitory computer-readable storage medium). The computer-readable storage medium stores therein computer program instructions that, when run on the controller 32, cause the controller 32 to perform the method for detecting refrigerant leakage.

For example, the computer-readable storage medium may include, but is not limited to: a magnetic storage device (e.g., a hard disk, a floppy disk, or a magnetic tape), an optical disk (e.g., a compact disk (CD), a digital versatile disk (DVD)), a smart card, and a flash memory device (e.g., an erasable programmable read-only memory (EPROM), a card, a stick or a key drive). The various computer-readable storage media described in the embodiments of the present disclosure may represent one or more devices and/or other machine-readable storage media, which are used for storing information. The term "machine-readable storage medium" may include, but is not limited to, wireless channels and various other media capable of storing, containing, and/or carrying instruction(s) and/or data.

Some embodiments of the present disclosure provide a computer program product. The computer program product includes computer program instructions (for example, the computer program instructions stored on a non-transitory computer-readable storage medium). When the computer program instructions are executed by the computer, the computer program instructions cause the computer to perform the method for detecting refrigerant leakage as described above.

Some embodiments of the present disclosure further provide a computer program. When the computer program is executed by a computer, the computer program causes the computer to perform the method for detecting refrigerant leakage.

A person skilled in the art will understand that, the scope of disclosure involved in the present disclosure is not limited to technical solutions formed by specific combinations of the above technical features, and shall cover other technical solutions formed by any combination of the above technical features or their equivalent features without departing from the concept of disclosure, such as technical solutions formed by replacing the above features with technical features with similar functions disclosed in some embodiments (but not limited thereto).

What is claimed is:

1. A method for detecting refrigerant leakage used for an air conditioner, the air conditioner including a controller, and the method comprising:
   when the air conditioner receives one of a cooling instruction and a dehumidification instruction, controlling, by the controller, the air conditioner to perform a corresponding one of a cooling operation and a dehumidification operation, wherein in a process of performing the corresponding one of the cooling operation and the dehumidification operation, the controller controls the air conditioner to perform a preset first control strategy for a first time to determine whether the air conditioner satisfies a preset condition, the preset condition including a plurality of preset sub-conditions;
   if the air conditioner satisfies the plurality of preset sub-conditions simultaneously for a first time, controlling, by the controller, the air conditioner to perform a preset second control strategy for a first time, wherein the second control strategy includes: controlling, by the controller, the air conditioner to operate for an eighth preset time;
   after the second control strategy has been performed for the first time, controlling, by the controller, the air conditioner to perform the first control strategy for a second time to determine whether the air conditioner satisfies the plurality of preset sub-conditions simultaneously for a second time; and
   if the air conditioner satisfies the plurality of preset sub-conditions simultaneously for the second time, controlling, by the controller, the air conditioner to send out alarm information indicating a possibility of refrigerant leakage; and
   after the controller controls the air conditioner to send out the alarm information indicating the possibility of refrigerant leakage, the method further comprising:
   controlling, by the controller, the air conditioner to perform the first control strategy for a third time to determine whether the air conditioner satisfies the plurality of preset sub-conditions simultaneously for a third time;
   if the air conditioner satisfies the plurality of preset sub-conditions simultaneously for the third time, controlling, by the controller, the air conditioner to perform the second control strategy for a second time;
   after the second control strategy has been performed for the second time, controlling, by the controller, the air conditioner to perform the first control strategy for a fourth time to determine whether the air conditioner satisfies the plurality of preset sub-conditions simultaneously for a fourth time; and
   if the air conditioner satisfies the plurality of preset sub-conditions simultaneously for the fourth time, determining, by the controller, that the refrigerant leakage occurs, and controlling, by the controller, the air conditioner to stop.

2. The method for detecting refrigerant leakage according to claim 1, wherein the air conditioner further includes a compressor, an indoor heat exchanger, a first fan, a second fan, and a display device; wherein the first fan is configured to discharge air after heat exchange with the indoor heat exchanger, and the second fan is configured to reduce a temperature of the compressor;
   wherein controlling, by the controller, the air conditioner to send out the alarm information indicating the possibility of refrigerant leakage, includes:
      controlling, by the controller, the display device to display a blinking fault code corresponding to the refrigerant leakage; and
   wherein controlling, by the controller, the air conditioner to stop, includes:
      controlling, by the controller, the compressor to stop;
      controlling, by the controller, the display device to display a fault code constantly;
      controlling, by the controller, the first fan to stop; and
      controlling, by the controller, the second fan to operate at a rated minimum speed for a first preset time and then stop.

3. The method for detecting refrigerant leakage according to claim 2, wherein the plurality of preset sub-conditions include a first preset sub-condition, a second preset sub-condition, and a third preset sub-condition;
   wherein the first control strategy includes:
      determining, by the controller, whether the compressor is turned on;
      if the compressor is turned on, determining, by the controller, whether the air conditioner satisfies the first preset sub-condition when the compressor operates for a second preset time accumulatively;
      if the air conditioner satisfies the first preset sub-condition, controlling, by the controller, the compressor to stop for a third preset time;
      after the third preset time, determining, by the controller, whether the compressor is turned on;
      if the compressor is turned on, determining, by the controller, whether the air conditioner satisfies the second preset sub-condition when the compressor operates for a fourth preset time accumulatively;
      if the air conditioner satisfies the second preset sub-condition, controlling, by the controller, the compressor to stop for a fifth preset time;
      after the fifth preset time, determining, by the controller, whether the compressor is turned on;
      if the compressor is turned on, determining, by the controller, whether the air conditioner satisfies the third preset sub-condition when the compressor operates for a sixth preset time accumulatively; and
      if the air conditioner satisfies the third preset sub-condition, controlling, by the controller, the compressor to stop for a seventh preset time.

4. The method for detecting refrigerant leakage according to claim 3, wherein:
   when the compressor operates for the second preset time accumulatively, determining whether the air conditioner satisfies the first preset sub-condition, includes:
      obtaining, by the controller, a first temperature difference between an ambient temperature and a temperature of the indoor heat exchanger every other preset interval; and in a case where first temperature differences obtained for consecutive preset times are each less than or equal to a preset temperature difference, determining, by the controller, that the air conditioner satisfies the first preset sub-condition;

when the compressor operates for the fourth preset time accumulatively, determining whether the air conditioner satisfies the second preset sub-condition, includes: obtaining, by the controller, a second temperature difference between the ambient temperature and the temperature of the indoor heat exchanger every other preset interval; and in a case where second temperature differences obtained for consecutive preset times are each less than or equal to the preset temperature difference, determining, by the controller, that the air conditioner satisfies the second preset sub-condition; and when the compressor operates for the sixth preset time accumulatively, determining whether the air conditioner satisfies the third preset sub-condition, includes: obtaining, by the controller, a third temperature difference between the ambient temperature and the temperature of the indoor heat exchanger every other preset interval; and in a case where third temperature differences obtained for consecutive preset times are each less than or equal to the preset temperature difference, determining, by the controller, that the air conditioner satisfies the third preset sub-condition.

5. The method for detecting refrigerant leakage according to claim 4, wherein the preset interval is 5 minutes, and a number of the consecutive preset times is 3, 4, or 5.

6. The method for detecting refrigerant leakage according to claim 4, wherein the preset temperature difference is 2° C.

7. The method for detecting refrigerant leakage according to claim 4, wherein the first temperature difference, the second temperature difference, and the third temperature difference are equal.

8. The method for detecting refrigerant leakage according to claim 4, wherein any one of the first preset time to the seventh preset time is less than the eighth preset time.

9. The method for detecting refrigerant leakage according to claim 4, wherein the eighth preset time is 90 minutes.

10. The method for detecting refrigerant leakage according to claim 3, wherein the third preset time, the fifth preset time, and the seventh preset time are equal or unequal.

11. The method for detecting refrigerant leakage according to claim 10, wherein the third preset time, the fifth preset time, and the seventh preset time are each 3 minutes.

12. The method for detecting refrigerant leakage according to claim 10, wherein the third preset time is 3 minutes, the fifth preset time is 4 minutes, and the seventh preset time is 5 minutes.

13. The method for detecting refrigerant leakage according to claim 3, wherein the second preset time is greater than the fourth preset time, and the fourth preset time is greater than the sixth preset time.

14. The method for detecting refrigerant leakage according to claim 13, wherein the second preset time is 20 minutes, the fourth preset time is 15 minutes, and the sixth preset time is 10 minutes.

15. The method for detecting refrigerant leakage according to claim 1, wherein the plurality of preset sub-conditions include a first preset sub-condition, a second preset sub-condition, and a third preset sub-condition; and the first control strategy includes:

if the controller determines that the air conditioner does not satisfy at least one of the first preset sub-condition, the second preset sub-condition, and the third preset sub-condition, controlling, by the controller, the air conditioner to re-perform the first control strategy.

16. The method for detecting refrigerant leakage according to claim 1, wherein the first control strategy includes:

when the controller receives a power-off instruction, a turned-off instruction or a preset mode switching instruction, controlling, by the controller, the air conditioner to re-perform the first control strategy.

17. An air conditioner, comprising:

a memory; and the controller, wherein the memory stores one or more computer programs thereon; the one or more computer programs include instructions that, when executed by the controller, cause the controller to perform the method for detecting refrigerant leakage according to claim 1.

18. A non-transitory computer-readable storage medium having stored thereon computer program instructions that, when run on the controller, cause the controller to perform the method for detecting refrigerant leakage according to claim 1.

* * * * *